US012650406B2

(12) United States Patent
Vassallo

(10) Patent No.: US 12,650,406 B2
(45) Date of Patent: Jun. 9, 2026

(54) CAPILLARY GEL ELECTROPHORESIS AND ITS USE WITH COMPLEX BIOLOGICAL MOLECULES

(71) Applicant: Ares Trading S.A., Aubonne (CH)

(72) Inventor: Oscar Vassallo, Guidonia Montecelio (IT)

(73) Assignee: ARES TRADING S.A., Aubonne (CH)

( * ) Notice: Subject to any disclaimer, the term of this patent is extended or adjusted under 35 U.S.C. 154(b) by 482 days.

(21) Appl. No.: 17/917,430

(22) PCT Filed: Apr. 1, 2021

(86) PCT No.: PCT/EP2021/058775
§ 371 (c)(1),
(2) Date: Oct. 6, 2022

(87) PCT Pub. No.: WO2021/204714
PCT Pub. Date: Oct. 14, 2021

(65) Prior Publication Data
US 2023/0152275 A1     May 18, 2023

(30) Foreign Application Priority Data

Apr. 7, 2020    (EP) .................................... 20168561

(51) Int. Cl.
G01N 27/447          (2006.01)
(52) U.S. Cl.
CPC ............................... G01N 27/44726 (2013.01)
(58) Field of Classification Search
None
See application file for complete search history.

(56) References Cited

U.S. PATENT DOCUMENTS

| | | | |
|---|---|---|---|
| 2004/0259269 | A1 | 12/2004 | Lin et al. |
| 2007/0062813 | A1 | 3/2007 | Gentalen et al. |
| 2012/0125775 | A1 | 5/2012 | Dolnik et al. |
| 2014/0004533 | A1 | 1/2014 | Siino et al. |
| 2015/0162177 | A1* | 6/2015 | McGivney ....... G01N 27/44795 |
| | | | 250/288 |

FOREIGN PATENT DOCUMENTS

| | | |
|---|---|---|
| CN | 101315384 A | 12/2008 |
| CN | 102016560 A | 4/2011 |

(Continued)

OTHER PUBLICATIONS

Y. Xu, "Tutorial: Capillary Electrophoresis", The Chemical Educator, 1(2): 14 pages, May 1996.*

(Continued)

*Primary Examiner* — J. Christopher Ball
*Assistant Examiner* — John C Ball
(74) *Attorney, Agent, or Firm* — EMD SERONO RESEARCH INSTITUTE

(57)     ABSTRACT

The invention described herein relates to an improved method for analytical capillary gel electrophoresis (CGE) for complex biologic molecules. The methods for the improved CGE include steps for the partial reduction of the biologic analyte molecule for use as calibration standard and use such partially reduced calibration sample to obtain an improved calibration curve for CGE to be used with biologic analyte molecules.

16 Claims, 11 Drawing Sheets

(56)        References Cited

FOREIGN PATENT DOCUMENTS

| CN | 104508473 A | 4/2015 |
| CN | 109475795 A | 3/2019 |
| WO | 8606383 A1 | 11/1986 |
| WO | 01/86306 A2 | 11/2001 |
| WO | 2008/042495 A2 | 4/2008 |
| WO | 2014/004959 A1 | 1/2014 |
| WO | 2014/172371 A2 | 10/2014 |
| WO | 2023/048191 A1 | 3/2023 |

OTHER PUBLICATIONS

K.M. Hutterer, et al., "Monoclonal antibody disulfide reduction during manufacturing", MAbs, 5(4): p. 608-613, Jul. 2013.*
Cherkaoui, S., et al., "Tracking of antibody reduction fragments by capillary gel electrophoresis during the coupling to microparticles surface," Journal of pharmaceutical and biomedical analysis, Oct. 2010, pp. 172-178, 53.2.
Smisek, David L., et al., "Agarose gel electrophoresis of high molecular weight, synthetic polyelectrolytes," Macromolecules, Sep. 1989, pp. 2270-2277, 22.5.
Weber, Klaus, et al., "The reliability of molecular weight determinations by dodecyl sulfate-polyacrylamide gel electrophoresis," Journal of Biological Chemistry, Aug. 1969, pp. 4406-4412, 244.16.
Anonymous, "Wikipedia—SDS Page," https://en.wikipedia.org/w/index.php?title=SDS-PAGE&oldid=949434264, Oct. 2022, 12 pages.
Anonymous, "Wikipedia—Gel electrophoresis," https://en.wikipedia.org/w/index.php?title=Gel_electrophoresis&oldid=944054016, Oct. 2022, 13 pages.
International Search Report and Written Opinion for corresponding application No. PCT/EP2021/058775, Jun. 17, 2021, 9 pages.
"Extended European Search Report received for European Patent Application No. 20168561.7, mailing date Oct. 21, 2020", 07 Pages.
"International Preliminary Report on Patentability received for PCT Application No. PCT/EP2021/058775, mailing date Oct. 20, 2022", 07 Pages.

* cited by examiner

CAPILLARY GEL ELECTROPHORESIS AND ITS USE WITH COMPLEX BIOLOGICAL MOLECULES

FIELD OF THE INVENTION

The invention described herein relates to analytical capillary gel electrophoresis (CGE).

BACKGROUND OF THE INVENTION

Capillary gel electrophoresis (CGE) is a sensitive and versatile technique which has emerged into the forefront of analytical methodology. Its applicability is enhanced by short separation times, facile and rapid methods of development and a requirement for very small amounts of analyte. Capillary gel electrophoresis relies on electro kinetic separation methods performed in submillimeter diameter capillaries and in micro- and nanofluidic channels. In CGE analytes migrate through electrolyte solutions under the influence of an electric field. Analytes can be separated according to molecular mass of the molecules present in the analyte.

The identity of molecules and their relative amounts in a test sample are frequently determined using CGE. Such determinations rely on the migration time(s) of the different constituents in such test sample. Considering the inter-experiment (i.e. experiment to experiment) variations in such migration times it is necessary to establish a proper calibration curve for each experiment. Such calibration curve is customarily obtained using a sample solution containing known amounts of a number of different molecules. These molecules are chosen to cover a range of molecular weights, preferably covering a range of molecular weights, which range encompasses the expected molecular weight of the analyte of interest.

In such sample/calibration solutions standard calibration molecules are customarily used. In standard CGE methods it is expected that the migration times of any of the molecules is directly correlated to their molecular weight. Thus, the only characteristic that is of relevance for the molecules in the sample/calibration solution is their molecular weight.

It has been noted however that for complex biologic molecules this direct correlation between migration times and molecular weight is not consistently observed. Some complex biologic molecules, in particular fusion proteins and antibodies (which proteins may be glycosylated), may have a migration time different from the expected migration time based on their molecular weight. Accordingly, the standard molecules provided in a calibration sample do not provide a calibration curve which can be used to identify the various complex biologic molecules. Misinterpretation of the identified peaks in a CGE chromatogram may than result in misidentification of the various molecules and their relative amounts in a test sample.

Therefore, there is a need in the art for an improved CGE method which would overcome these problems observed when carrying out analytical CGE with complex biologic molecules.

SUMMARY OF THE INVENTION

The present invention provides a solution to the problems described above. An improved method is provided for analytical CGE for complex biologic molecules. In particular, such improved method comprises obtaining a calibration curve with a partially reduced calibration solution of the analyte biologic molecule of interest. In one embodiment there is provided a method of determining the molecular weight of constituents of a test sample containing a biologic molecule using capillary gel electrophoresis (CGE), the method comprising the steps of: a.) obtaining a calibration curve for the biologic molecule in CGE comprising the steps of partially reducing a calibration sample comprising a known amount of the biologic molecule, submitting the partially reduced calibration sample to CGE, determining the migration times of the components of the partially reduced biologic molecule in the partially reduced calibration sample, and calculate the calibration curve for the biologic molecule in CGE; b.) submitting the test sample containing the biologic molecule to CGE; c.) determining the migration times of the constituents in the test sample; and d.) identifying the molecular weight of the constituents in the test sample by comparing the migration times with the calibration curve obtained in step a). Such method is particularly useful in the analysis of samples containing complex biologic molecules such as antibodies or fusion proteins.

In another embodiment there is described a method for identifying the composition of a test sample containing a biologic molecule comprising: a.) determining the molecular weight of the constituents of the sample according to the method described in the previous embodiment comprising the steps of obtaining a calibration curve for the biologic molecule in CGE by partially reducing a calibration sample comprising a known amount of the biologic molecule, submitting the partially reduced calibration sample to CGE, determining the migration times of the components of the partially reduced biologic molecule in the partially reduced calibration sample, and calculate the calibration curve for the biologic molecule in CGE, submitting the test sample containing the biologic molecule to CGE, determining the migration times of the constituents in the test sample, and identifying the molecular weight of the constituents in the test sample by comparing the migration times with the calibration curve; b.) identifying the constituents of the sample based on their molecular weight, and determine the relative amounts of each of the constituents based on the CGE performed in step a.).

In another embodiment there is described a method of determining the purity of a sample containing the biologic molecule comprising: a.) identify the composition of the sample according to the method described in the previous embodiment and b.) determine the relative amount of the biologic molecule of interest present in the sample.

DETAILED DESCRIPTION

Capillary gel electrophoresis (CGE) is a frequently used analytical method to determine the composition of an analyte sample. The method can be used qualitatively and semi-quantitatively to determine the composition of an analyte sample, such as for example produced in the production of an active pharmaceutical ingredient. As an initial step in such analytical method a calibration of the method is carried out by means of a calibration curve with molecules of known molecular weight. The identity, as compared to their molecular weight, of molecules present in a sample are based on their migration times in comparison to the migration times of the molecules of known molecular weight as in the calibration curve made with the same molecule that is under investigation. The method relies on the direct correlation between migration time and the molecular weight of the molecules in the tested samples. However, migration times for complex biologic molecules in CGE may not always correlate directly to their molecular weight in comparison to the migration times for the conventional standard molecules in a calibration sample.

Figure 1:
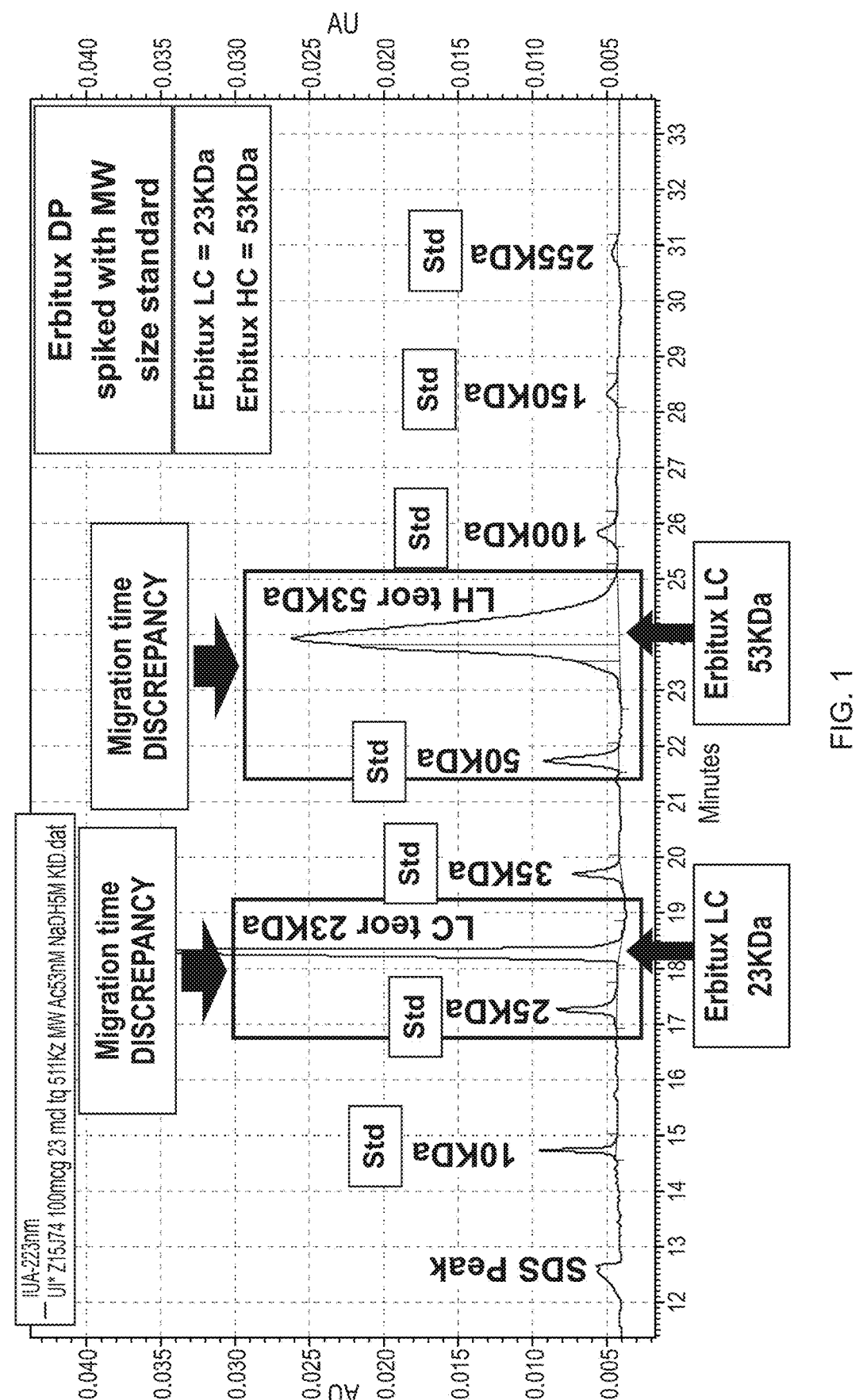
FIG. 1; shows the migrations times of a sample containing the customary molecular weight calibration molecules spiked with a complex biologic molecule (Cetuximab (Erbitux®)). Clearly shown is the discrepancy between the migration times of the standard sizing molecules (Std) and the cetuximab molecular subunits/species (considering their theoretical weights) (Erbitux LC and Eritux HC).

In FIG. 1, an example is provided wherein a sample containing the standard molecular weight standards is mixed with a certain amount of the antibody cetuximab (known as Erbitux®). It is clear that the subunits/species of cetuximab, which have a molecular weight of 23 kD and 53 kD have different migration times compared to the conventional standards having approximately the same molecular weight. As a result, the 23 kD cetuximab subunit/species migrates compared to the 25 kD standard with a migration time that appears to be around 30 kD. Likewise, the 53 kD cetuximab subunit/species has a migration time compared to the 50 kD (and 100 kD) standard that appears closer to a molecule of around 75 kD. Any such discrepancies may be due because such complex molecules upon exposure to reductants disintegrate in multiple components or the molecules are of such size or contain a certain exposed charge and complex sugars that will cause their migration under an electric field and interaction with a Dextran-based gel matrix (as commonly used) in CGE to behave differently from conventional standards that are mostly un-glycosylated.

Figure 2:
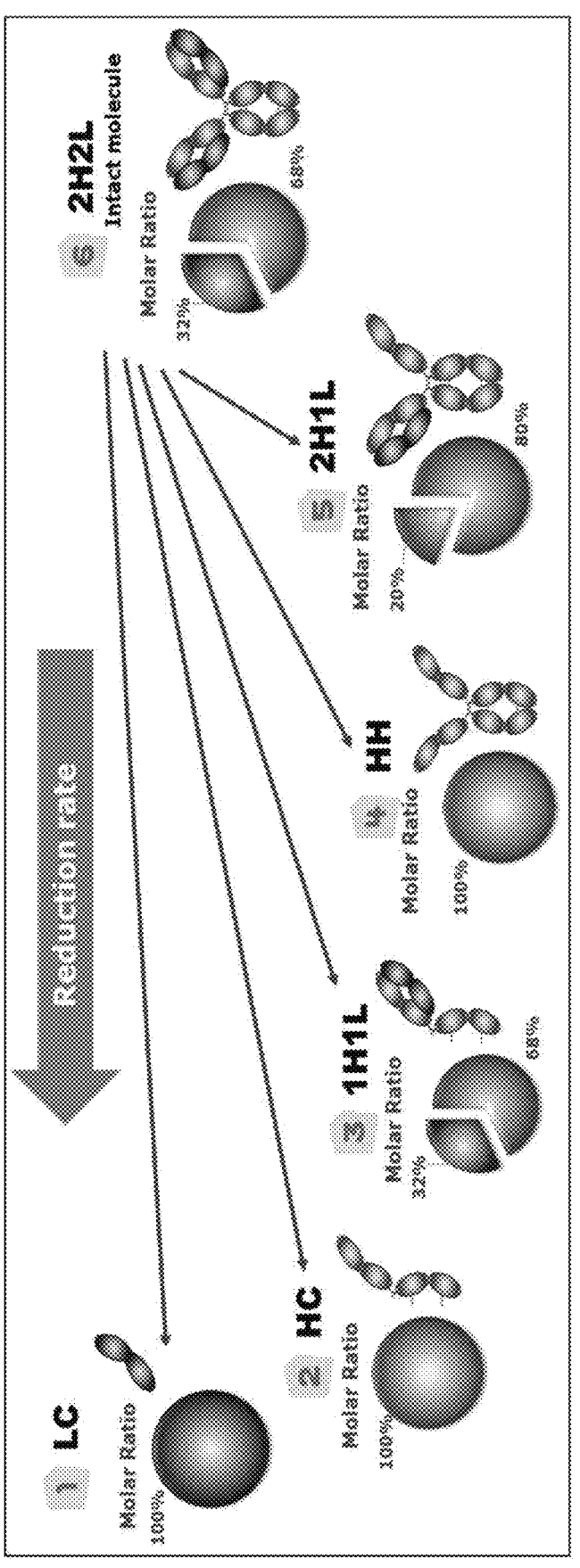
FIG. 2; shows the expected molar ratio's for both light chain (LC) and heavy chain (HC) included in each of the different molecular subunits/species of a partially reduced antibody.
Figure 3:
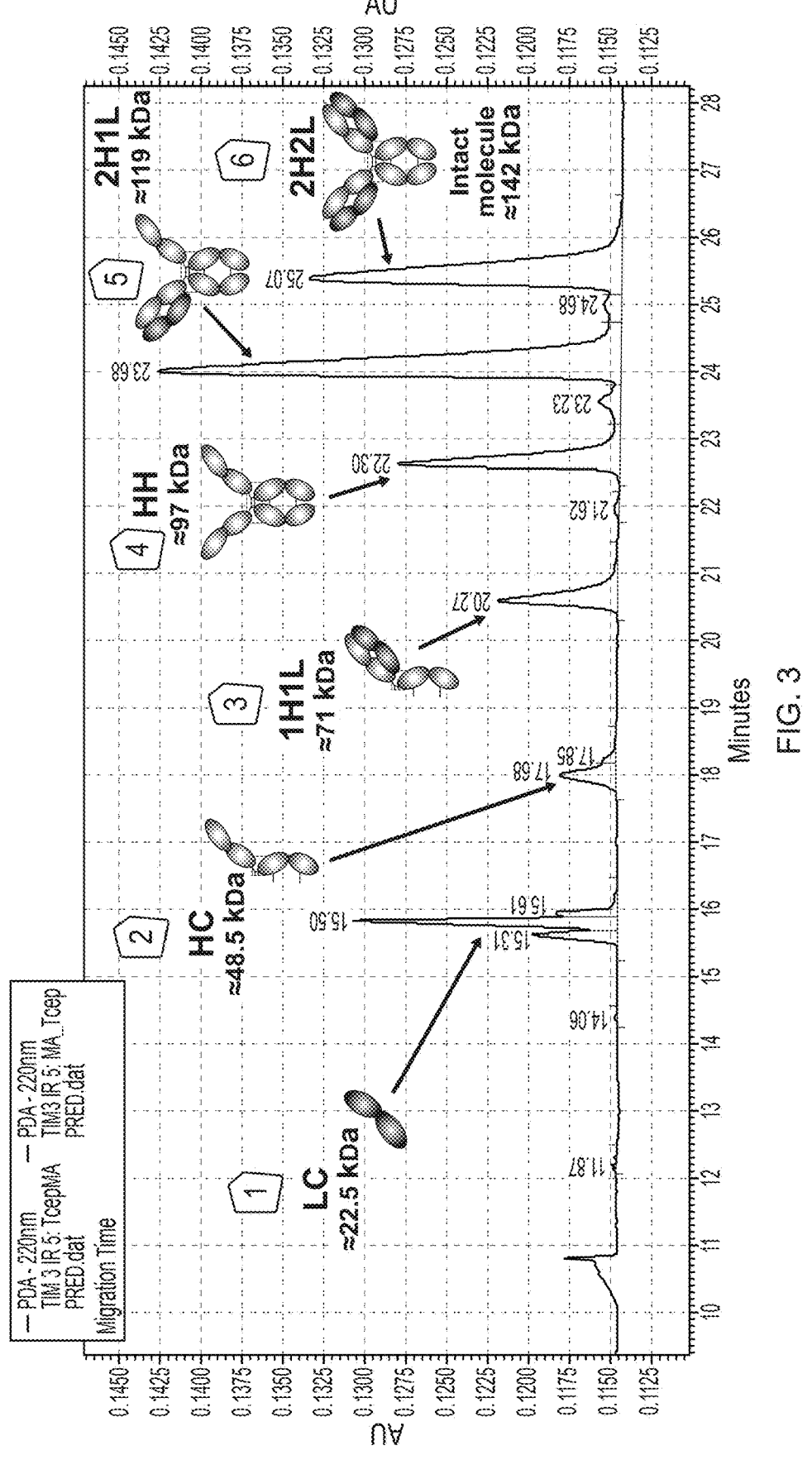
FIG. 3; shows the different migration times and calculated molecular weights for molecular subunits/species of a partially reduced human IgG2 Non-Glycosylated antibody (anti-TIM3).
Figure 4:
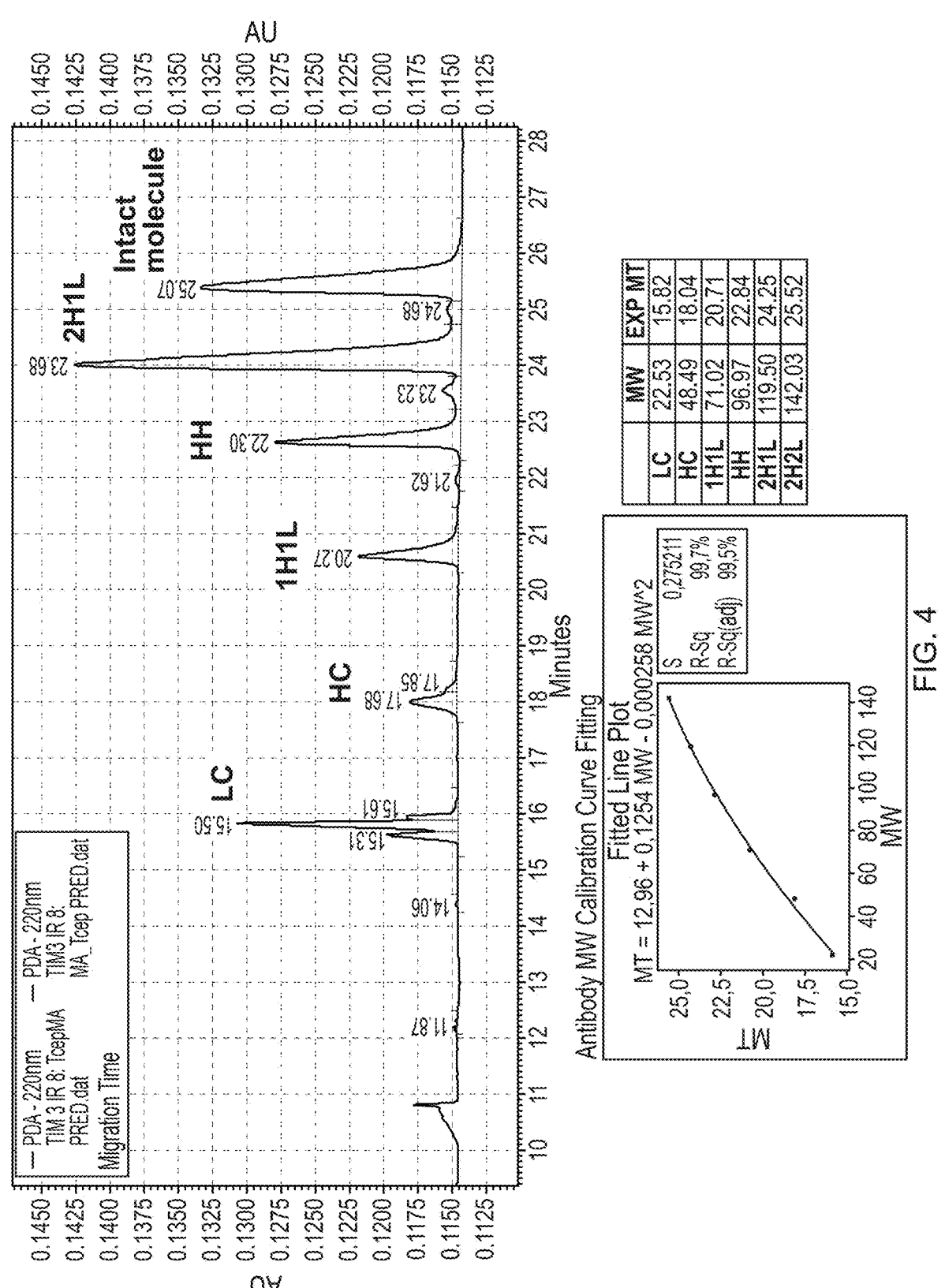
FIG. 4; shows the different migration times for molecular subunits/species of a partially reduced human IgG2 Non-Glycosylated antibody (anti-TM3) and the resulting calibration curve based on the observed migration times.

In the present invention the calibration curve is obtained with a sample of the analyte biologic molecule of interest instead of using the conventional calibration standards. Moreover, the calibration curve is obtained using a novel method for partially reducing the complex analyte biologic molecule of interest. The method of partially reducing the complex analyte biologic molecule of interest enables obtaining a calibration curve with various components (or combinations thereof) of the analyte biologic molecule of interest. For example, the analyte biologic molecule of interest is an antibody protein. Such antibody protein is a complex molecule consisting of multiple elements (subunits or species) to form the antibody protein. Two light chain and two heavy chain proteins make up a complete antibody. As shown in FIG. 2, partial reduction of an antibody sample results in multiple distinct elements (subunits/species) with distinct molecular weights and a single specific molar ratio. FIG. 2 shows such possible subunits/species of such partial reduction of an antibody including individual light chains (LC), individual heavy chains (HC), a single combination of a light chain and heavy chain (1H1L), a combination of two heavy chains (HH), a combination of two heavy chains and one light chain (2H1L), and the intact antibody molecule (2H2L). For a human IgG2 non-glycosylated exemplary antibody (anti-TIM3) the molecular weight of each of the molecular subunit/species is known as shown in FIG. 3.

The analyte biologic molecule of interest as used in the method of the present invention includes antibodies, single chain antibodies, fusion proteins, chimeric proteins and any other proteins having one or more subunits or one or more reductions sites (such as disulfide bonds). Preferably, for such analyte biologic molecule of interest the molar ratio of the molecular subunits/species is known. Although particularly useful for analyte biologic molecules the method of the present invention is not limited to a use with complex biologic molecules. Any analyte molecule comprising reducible subunits can be used in the method of the present invention.

The partial reduction of the analyte biologic molecule comprises at least two major steps. In a first step a reducing agent is employed to partially reduce the complex biologic molecule. In another step an alkylating agent is used which quenches the mixture of the complex biologic molecule and the reducing agent and prevents further reduction of the complex biologic molecule. Thus, partial reduction of the calibration sample of the analyte biologic molecule of interest comprises: a.) adding to a buffered solution containing the known amount of the biologic molecule a reducing agent, and b.) incubating the calibration sample of step a) for a period of time, wherein the length of the period of time is such that biologic molecule is not fully reduced. Within such time period wherein the biologic molecule is not fully reduced the method may further comprise: c.) adding an alkylating agent to the partially reduced calibration sample of step b, and d.) incubating the partially reduced calibration sample of step c) for a period of time.

In the above method of partially reducing the complex biologic molecule the first step (step a.) is preferable carried out at room temperature for a period of about 30 minutes or less. The step of incubating the partially reduced calibration sample with an alkylating agent (step d.) is preferable carried out at a temperature in the range of room temperature to about 75° C., preferably between about 50° C. and about 75° C., more preferably at about 70° C. Incubation of the partially reduced calibration step with the alkylating agent is for a period of up to about 15 min, preferably from about 5 min to about 15 min, more preferably for a period of about 10 min. The term "about" herein is defined as an amount plus or minus 10 percent of the stated value. Thus about 50° C. indicates 50° C.+/−5° C. and about 30 min indicates 30 min+/−3 min.

The concentrations used for the reducing agent and the alkylating agent in the partial reduction method of the present invention is from about 15 to 500 mM, preferably from about 30 to about 470 mM, more preferably from about 125 mM to about 375 mM, even more preferably from about 200 mM to about 300 mM. The reducing agent and alkylating agent are preferably used in a concentration ratio of reducing agent:alkylating agent of about 0.16 to 0.80. As such the concentration ratio of reducing agent to alkylating agent is in the range of 0.15:3, suitably from 1:6.5 to 3:1. More preferably the ratio of reducing agent to alkylating agent is 1:1. Preferably, the concentration of reducing agent and alkylating agent is 250 mM.

As reducing agent any conventional reducing agent can be used. Preferably the reducing agents is 2-mercaptoethanol, 2-mercaptoethylamine, dithiotreitol (DTT), Tris (2-carboxyethly) phophine (TCEP) or dithiobuthylamine (DTBA). More preferably the reducing agent is TCEP.

As alkylating agent any conventional alkylating agent can be used. Preferably the alkylating agent is selected from maleimide or a derivative thereof, 9-anthracenemethanol or a derivative thereof, 1-naphtalinemethanol, 2,2-biphenyldimethanol, 2-indanol, iodineacetmide, dithiotreitol (DTT), ammoniumbicarbonate, streptozocin, N-nitro-Nethylurea, Procarbazine, temozolomide, busulfan, 2-chloro-2-methylpropane, carmustine, cyclophosphamide, 2-bromo-3'-methoxyacetophenone, 4-chloro-1-butanol, 3-chloropropionamide, bromoacetylchololine bromide, 1,10-diiodeodecane, 5-chlorovaleroyl chloride, R(−)-chloroethylnorapomorphine, ethyl methanesulfonate, methyl trifluoromethanesulfonate, tetrapentylammonium bromide, N,N-dimethylisopropylamine, 1-chloro-2,4-dinitrobenzene, 4,4'-diisothiocyanatostilbene-2,2'-disulfonic acid disodium salt hydrate, ethyl 7-bromoheptanoate, 2-fluorobenzyl bromide, 2,3-dihydro-3-oxo-4H-1,4-benzoxazine-4-propionic acid, ellagic acid, phenethylamine, dacarbazine, cis-1,5-dimethylbicyclo[3.3.0]octane-3,7-dione, 2,4'-dichloroacetophenone, 3,4-dichlorobenzyl chloride, trimethylsilyl bromoacetate, (3-bromopropoxy)-tert-butyldimethylsilane, diethylsulfate, 2-(2-bromoethyl)-1,3-dioxolane, 1,3-bezodithiolylium tetrafluoroborate, 4-(4-Nitrobenzyl)pyridine, 5-methoxyindole-2-carboxylic acid, phosphazine base, ethyl p-toluenesulfonate, N-Boc-5-methoxyindole, lomeguatrib, and chloroacetonitrile. As referred to herein, suitable derivatives of maleimide are propylmaleimide, N-ethylmaleimide, N-methylmaleimide, N-(2-hydroxyethyl) maleimide, N-hydroxymaleimide, N-(1-phenylethyl)-maleimide, N-(4-chlorphenyl) maleimide, 2-maleinimidoethyl-mesylate, 1-(4-aminophenyl)-1H-pyrrole-2,5-dione, N-phenylmaleimide, 1-(2-aminoethyl) maleimide, N-(2-aminoethyl)-maleimide-trifluoroacetate, N-tert-butylmaleimide, N-benzylmaleimide, and N-ethylmaleimide. In addition, as referred to herein suitable derivatives of 9-anthracenemethanol are α-methyl-9-anthrylmethanol, 9-fluoronmethanol, methacrylacid-9-antracenylmethyl ester, 9-antracencarbaldehyde, 9-antracencarboylic acid, 9-(methylaminomethyl)-antracene. More suitable the alkylating agent is selected from maleimide, iodoacetamide and 9-antracenemethanol. Even more preferable the alkylating agent is maleimide.

As such the improved method of the present invention comprises obtaining a calibration curve with a partially reduced calibration solution of the analyte biologic molecule of interest. In one embodiment there is provided a method of determining the molecular weight of constituents of a test sample containing a biologic molecule using capillary gel electrophoresis (CGE), the method comprising the steps of: a.) obtaining a calibration curve for the biologic analyte molecule in CGE comprising the steps of partially reducing a calibration sample comprising a known amount of the biologic molecule, submitting the partially reduced calibration sample to CGE, determining the migration times of the components of the partially reduced biologic analyte molecule in the partially reduced calibration sample, and calculate the calibration curve for the biologic analyte molecule in CGE; b.) submitting the test sample containing the biologic analyte molecule to CGE; c.) determining the migration times of the constituents in the test sample; and d.) identifying the molecular weight of the constituents in the test sample by comparing the migration times with the calibration curve obtained in step a). Such method is particularly useful in the analysis of samples containing complex biologic molecules such as antibodies or fusion proteins.

The calibration curve can be obtained according to the method as described above for obtaining a calibration curve through the partial reduction of a known sample of the analyte biological molecule. Accordingly, in a method of the present invention for determining the molecular weight of the constituents of a test sample comprises, a.) obtaining a calibration curve for the biologic analyte molecule in CGE comprising the steps of partially reducing a calibration sample comprising a known amount of the biologic molecule, submitting the partially reduced calibration sample to CGE, determining the migration times of the subunits/species of the partially reduced biologic analyte molecule in the partially reduced calibration sample, and calculate the calibration curve for the biologic analyte molecule in CGE. The partial reduction of the calibration sample comprising the steps of adding to a buffered solution containing the known amount of the biologic molecule a reducing agent and incubating the calibration sample for a period of time such that the biologic molecule is not fully reduced. Such partial reduction may further include subsequently adding an alkylating agent to the partially reduced calibration sample and incubating the partially reduced calibration sample at a temperature of about 0° C. to about 75° C. for a period of up to 15 minutes. In a following step of the method (step b.)

submitting the test sample containing the biologic analyte molecule to CGE and in step c.) determining the migration times of the constituents in the test sample and in step d.) identifying the molecular weight of the constituents in the test sample by comparing the migration times with the calibration curve obtained in step a).

The present invention further includes a method of determining or confirming the identity of a biologic analyte molecule in a test sample. For example, such method comprises obtaining a calibration curve with a known biologic analyte molecule as described above using partial reduction of the biologic analyte molecule as calibration sample. Subsequently, using the partial reduction of the test sample and the CGE method of the present invention to determine or confirm the identity of the biologic molecule in the test sample. Such method therefore may comprise the steps of: a) obtaining a calibration curve for the biologic molecule in CGE comprising the steps of partially reducing a calibration sample comprising a known amount of the biologic molecule, submitting the partially reduced calibration sample to CGE, determining the migration times of the subunits/species of the partially reduced biologic molecule in the partially reduced calibration sample, and calculate the calibration curve for the biologic molecule in CGE; b) submitting the test sample containing the biologic molecule to CGE; c) determining the migration times of the constituents in the test sample; and d) identifying the molecular weight of the constituents in the test sample by comparing the migration times with the calibration curve obtained in step a) and determining or confirming the identity of the biologic analyte molecule in the test sample based on the identicality of the molecular weight subunits/species of the biologic analyte molecule in the test sample and the known biologic molecule in the calibration sample.

Likewise the present invention provides for a method for identifying the composition of a sample containing a biologic molecule of interest comprising determining the molecular weight of the species (constituents or subunits) of the sample as through any of the method steps described above, identifying the species (constituents or subunits) based on their molecular weight and determine the relative amounts of each of the species (constituents or subunits) as obtained from the Capillary Gel Electrophoresis (CGE). Such method of the present invention can further be applied to determine the purity of a sample containing the biologic analyte molecule of interest be determining the relative amount of the each species (constituents or subunits) to determine the relative amount of the entire biologic analyte molecule of interest compared to other molecules in the test sample which have different molecule weights.

EXAMPLES

Figure 5:
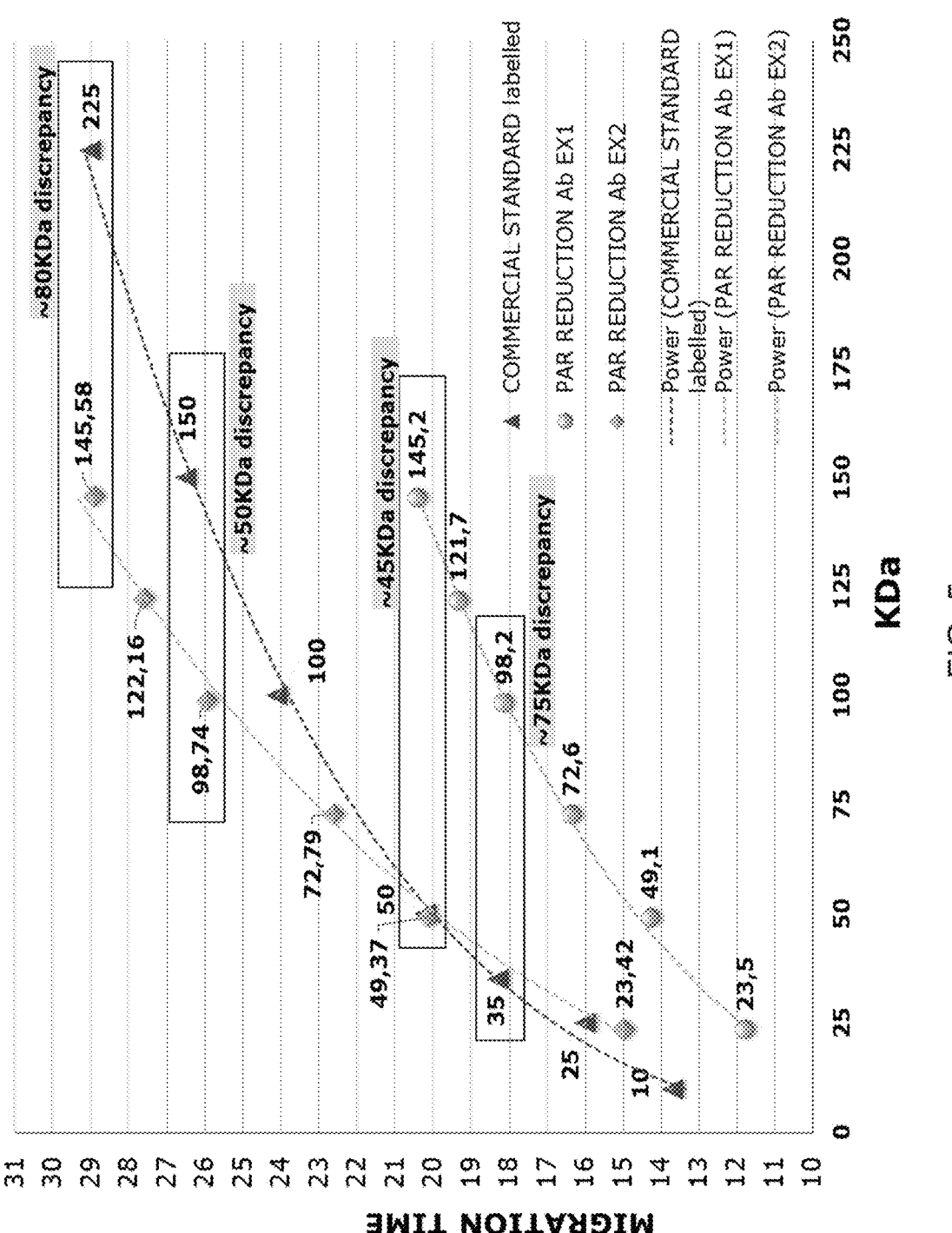
FIG. 5; shows the different migration times for molecular subunits/species of two partially reduced antibodies in comparison with the commercial size standard species migration, with the relative calibration curve and the huge discrepancies found in the comparison of the tree curves.

The following example are for illustrative purposes and are not intended to limit the scope of the invention. The different migration times for molecular subunits/species of two partially reduced antibody in comparison with the commercial size standard species migration have been reported in FIG. 5. The huge discrepancies, ranging from 40 to 80 kDa of difference found in the comparison of the tree curves, remarks and demonstrate the needs to have a new kind of standard calibration curve, that is precisely related to the protocol presented here.

All the examples 1-6 of molecules with their molecular characteristics submitted to Partial Reduction Protocol have shown a positive Protocol response in terms of experimental results. In all subsequent examples the Partial Reduction Protocol for the biologic molecules consisted of the following steps. The biologic molecule in a sample buffer contained 20 µl sample, 75 µl sample buffer (50 mM Acetate pH 5.5+2% SDS) such that the sample contained approximately 5 mg/ml of the biologic molecule of interests. To this sample of the biologic molecule of interest in sample buffer 5 µl of 250 mM TCEP was added at room temperature. This mixture was incubated for 10 minutes at room temperature after which 5 µl 250 mM Maleimide was added. This combined mixture was then incubated for 10 minutes at 70° C. The partially reduced sample so prepared was then submitted to CGE under standard conditions (System: PA 800 Plus Capillary Electrophoresis System (Beckman Coulter); Detector: UV (DAD) at 220 nm; Capillary: Bare fused silica capillary (Beckman Coulter); 50 µm i.d. 30.2 cm, 20.2 cm effective length from the sample introduction inlet and the detector window, 200 µm aperture clip in the cartridge; Cartridge temperature: 25° C.; Sample holder temperature: 15° C.; Voltage and timing: 15 kV (reverse polarity) for 35-45 minutes depending on analyte; Pre-injection steps: NaOH 0.1N to clean the capillary (20 psi, 10 min), HCl 0.1 N to neutralize the capillary surface (20 psi, 5 min), Water to remove the acidic solution (20 psi, 2 min), SDS Gel to fill the capillary (70 psi, 10 min), MilliQ water per injection (inject-pressure 7 psi, 10 sec); Materials and consumables: IgG Purity/Heterogeneity Analysis KIT, SCIEX, Code A10663, SDS-MW Gel Buffer, SCIEX, Code A30341, Bare Fused-Silica Capillary—50 µm ID, 375 µm OD, 67 cm, SCIEX, Code 33845).

Example 1

Figure 6:
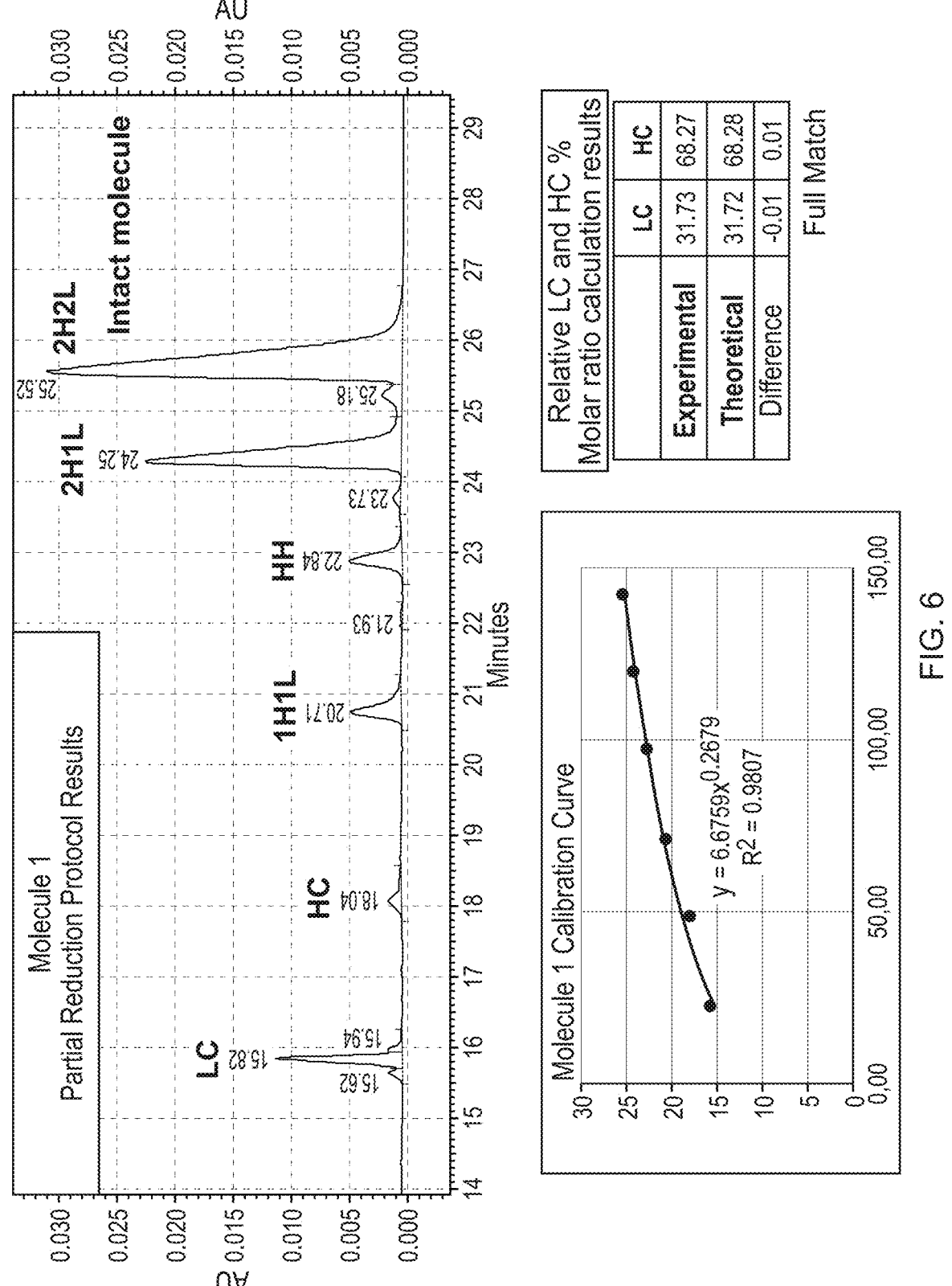
FIG. 6; shows the different migration times for molecular subunits/species of a partially reduced human IgG2 Non-Glycosylated antibody (anti-TM3), the resulting calibration curve based on the observed migration times and the comparison between experimental and theoretical molar ratio relative percentages.

A human IgG2 Non-Glycosylated antibody (anti-TM3) was submitted to partial reduction as described above. The obtained partially reduced calibration sample was submitted to capillary gel electrophoresis (CGE) under standard conditions (as described above). As shown in FIG. 6, the human IgG2 Non-Glycosylated antibody (anti-TM3) that was submitted to Partial Reduction Protocol produced all the expected molecular antibody subunits/species and the resulting calibration curve based on the different migration times fitting. The full match between experimental and theoretical relative molar ratio for LC and HC of such species was observed.

Example 2

Figure 7:
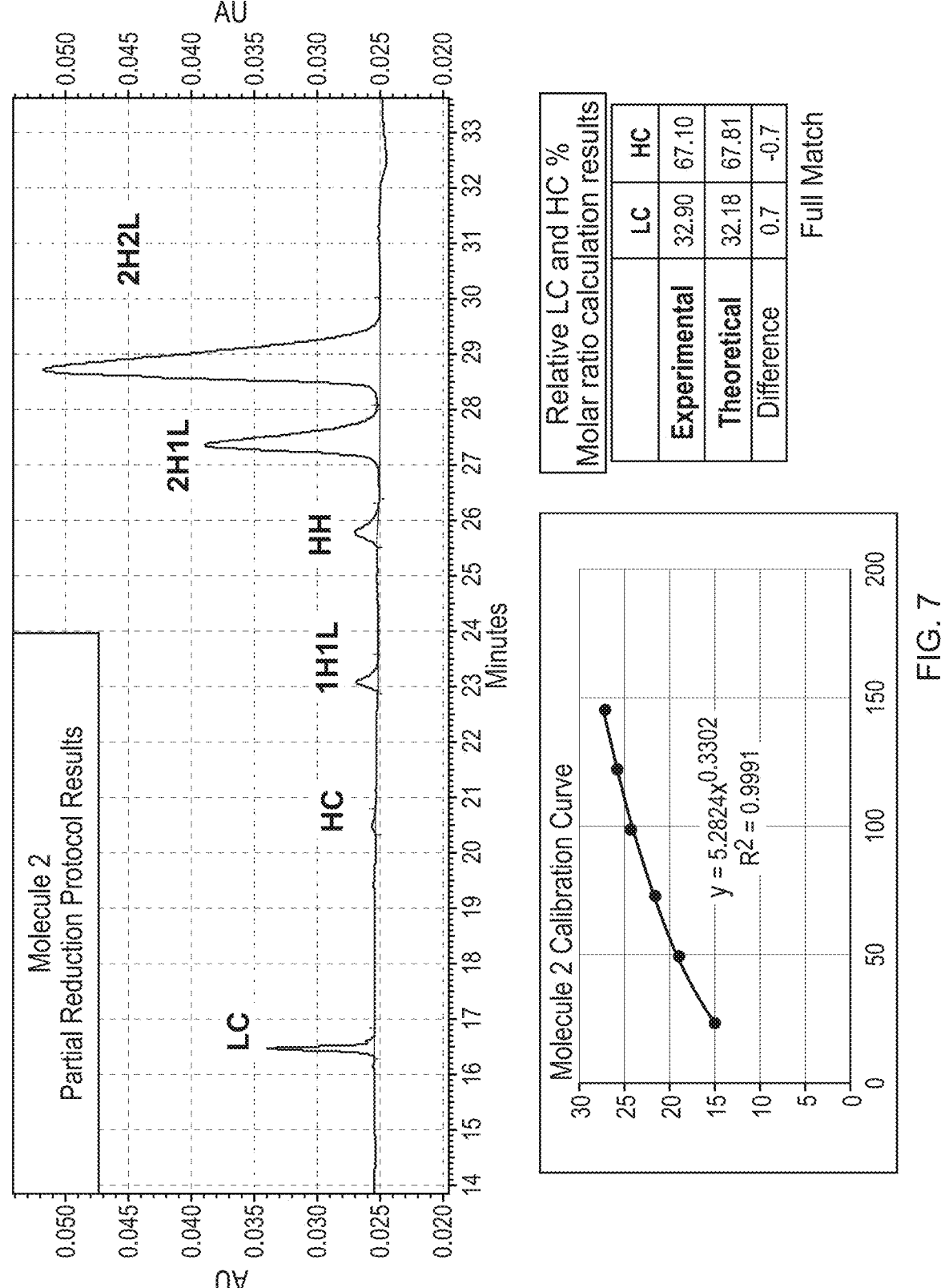
FIG. 7; shows the different migration times for molecular subunits/species of a partially reduced IgG1 Glycosylated antibody, the resulting calibration curve based on the observed migration times and the comparison between experimental and theoretical molar ratio relative percentages.

An IgG1 Glycosylated antibody was submitted to the Partial Reduction Protocol as described above and the obtained partially reduced sample was submitted to CGE (as described above). As shown in FIG. 7, the IgG1 Glycosylated antibody produced all the expected molecular antibody subunits/species and the resulting calibration curve based on the different migration times fitting. The full match was observed be noted.

Example 3

Figure 8:
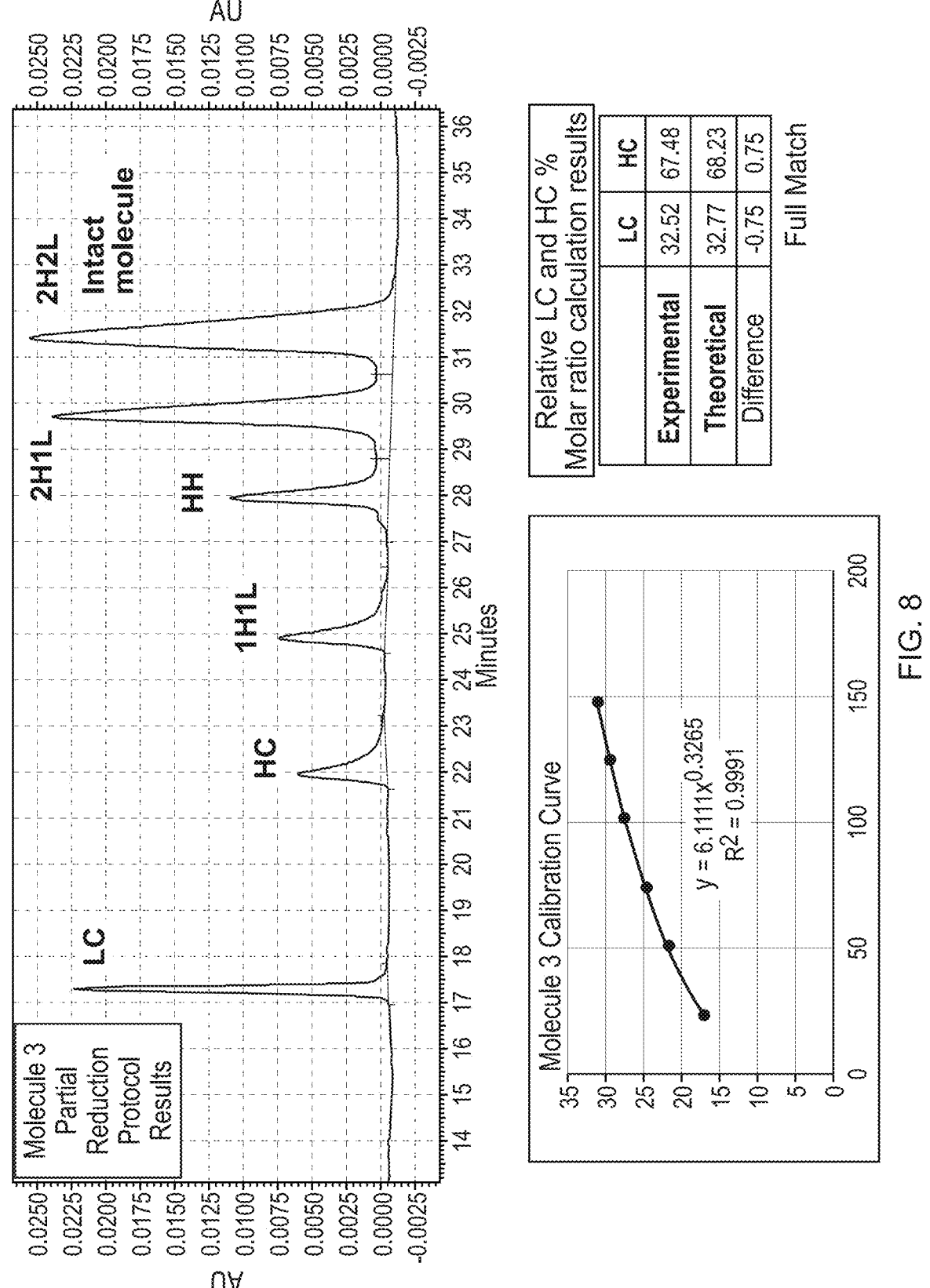
FIG. 8; shows the different migration times for molecular subunits/species of a partially reduced IgG1 with kappa light chain Glycosylated antibody, the resulting calibration curve based on the observed migration times and the comparison between experimental and theoretical molar ratio relative percentages.

An IgG1 with kappa light chain Glycosylated antibody was submitted to Partial Reduction Protocol as described above and the obtained partially reduced sample was submitted to CGE (as described above). As shown in FIG. 8, the IgG1 with kappa light chain Glycosylated antibody produced all the expected molecular antibody subunits/species and the resulting calibration curve based on the different migration times fitting. The full match between experimental and theoretical relative molar ratio for LC and HC of such species was observed.

Example 4

Figure 9:
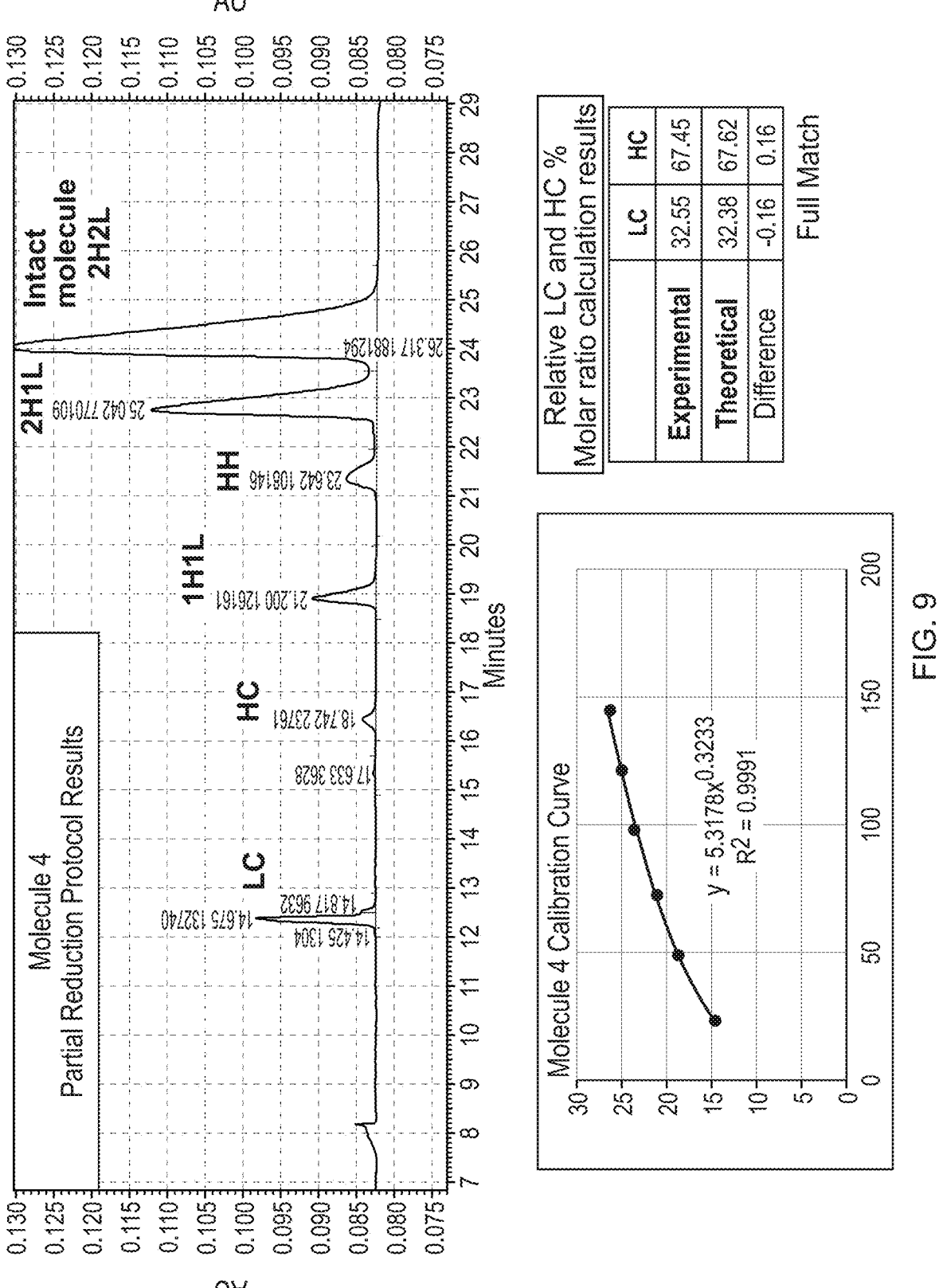
FIG. 9; shows the different migration times for molecular subunits/species of a partially reduced IgG1.4 moiety conjugated to Dolaflexin with a maleimide-based Cys linker Glycosylated antibody, the resulting calibration curve based on the observed migration times and the comparison between experimental and theoretical molar ratio relative percentages.

An IgG1 IgG1.4 moiety conjugated to Dolaflexin with a maleimide-based Cys linker Glycosylated antibody was submitted to the partial reduction protocol as described above to obtain a partially reduced sample which was submitted to CGE (as described above). As shown in FIG. 9, the IgG1.4 moiety conjugated to Dolaflexin with a maleimide-based Cys linker Glycosylated antibody produced all the expected molecular antibody subunits/species and the resulting calibration curve based on the different migration times fitting. The full match between experimental and theoretical relative molar ratio for LC and HC of such species was observed.

Example 5

Figure 10:
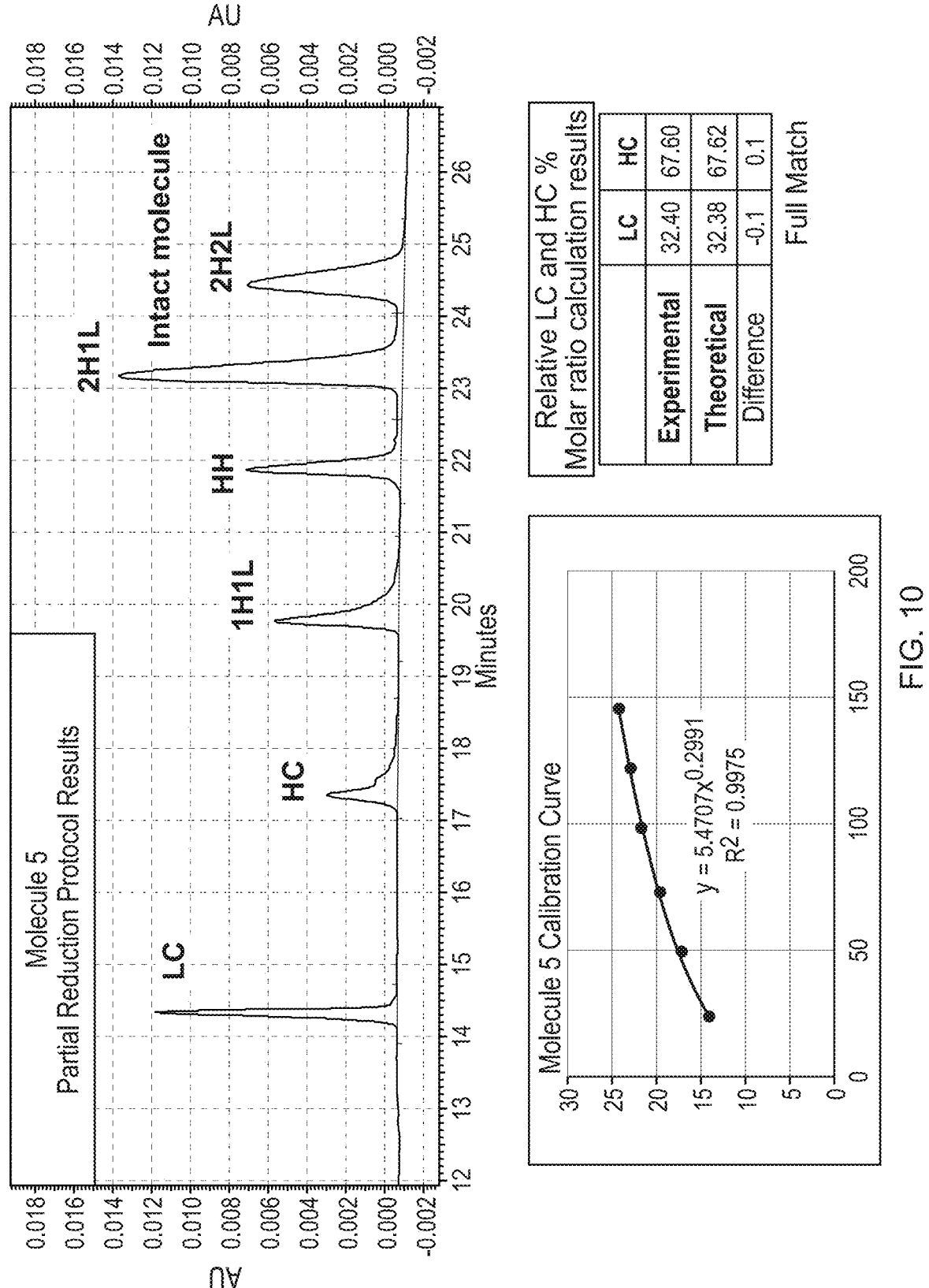
FIG. 10; shows the different migration times for molecular subunits/species of a partially reduced Chimeric mouse/human IgG1 Non-Glycosylated antibody, the resulting calibration curve based on the observed migration times and the comparison between experimental and theoretical molar ratio relative percentages.

A Chimeric mouse/human IgG1 Non-Glycosylated antibody was submitted to partial reduction protocol as described above to obtain a partially reduced sample which was submitted to CGE (as described above). As shown in FIG. 10, the Chimeric mouse/human IgG1 Non-Glycosylated antibody produced all the expected molecular antibody subunits/species and the resulting calibration curve based on the different migration times fitting. The full match between experimental and theoretical relative molar ratio for LC and HC of such species was observed.

Example 6

Figure 11:
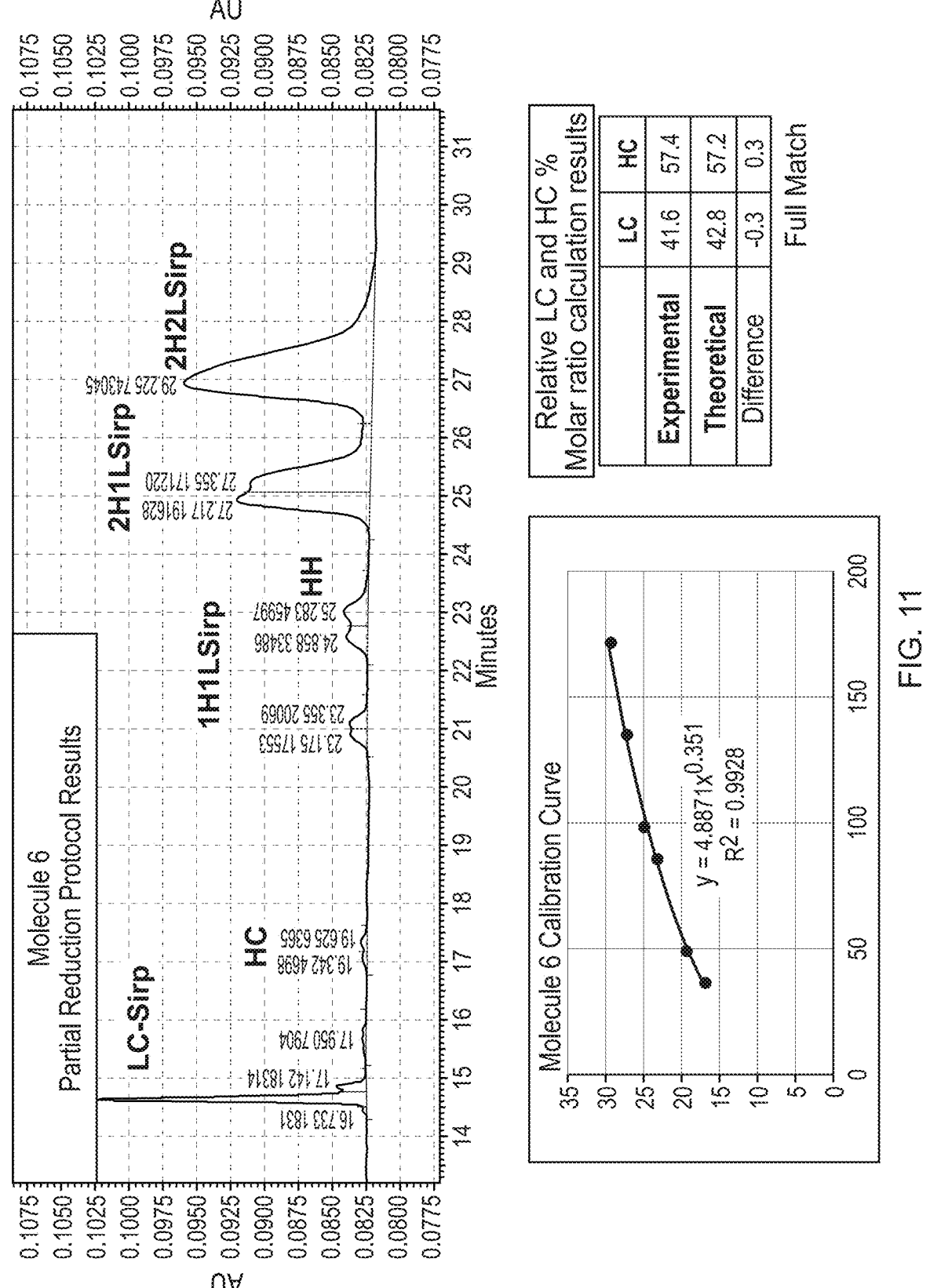
FIG. 11; shows the different migration times for molecular subunits/species of a partially reduced Fusion IgG1 with Sirp-α domain linked to LC Glycosylated antibody, the resulting calibration curve based on the observed migration times and the comparison between experimental and theoretical molar ratio relative percentages.

A fusion IgG1 with Sirp-α domain linked to LC Glycosylated antibody was submitted to Partial Reduction Protocol as described above to obtain a partially reduced sample which was submitted to CGE (as described above). As shown in FIG. 11, the fusion IgG1 with Sirp-α domain linked to LC Glycosylated antibody produced all the expected molecular antibody subunits/species and the resulting calibration curve based on the different migration times fitting. The full match between experimental and theoretical relative molar ratio for LC and HC of such species was observed.

The invention claimed is:

1. A method of determining the molecular weight of constituents of a test sample containing a biologic molecule using capillary gel electrophoresis (CGE), the biologic molecule being one that (i) has a migration time different from an expected migration time based on its molecular weight and/or (ii) has a subunit/species that when the biologic molecule is partially reduced has a migration time different from an expected migration time based on its molecular weight, the method comprising the steps of:
  a) obtaining a calibration curve for the biologic molecule in CGE comprising the steps of partially reducing a calibration sample comprising a known amount of the biologic molecule, submitting the partially reduced calibration sample to CGE, determining the migration times of the subunits/species of the partially reduced biologic molecule in the partially reduced calibration sample, and calculating the calibration curve for the biologic molecule in CGE;
  b) submitting the test sample containing the biologic molecule to CGE;

c) determining the migration times of the constituents in the test sample; and
  d) identifying the molecular weight of the constituents in the test sample by comparing the migration times with the calibration curve obtained in step a).

2. The method of claim 1, wherein the step of partially reducing the calibration sample comprises:
  a) adding to a buffered solution containing the known amount of the biologic molecule a reducing agent, and
  b) incubating the calibration sample of step a) for a period of time, wherein the length of the period of time is such that biologic molecule is not fully reduced.

3. The method of claim 2, wherein the step of partially reducing the calibration sample comprises:
  a) adding the reducing agent to the buffered solution,
  b) incubating the calibration sample at room temperature for a period of 30 minutes or less, and further comprising the steps of
  c) adding an alkylating agent to the partially reduced calibration sample of step b, and
  d) incubating the partially reduced calibration sample of step c) at a temperature of 0° C. to 75° C., for a period of up to 15 minutes.

4. The method according to claim 3, wherein the reducing agent and the alkylating agent are added to the solution in a concentration ratio of reducing agent:alkylating agent of 0.15 to 3.

5. The method according to claim 3, wherein the reducing agent and the alkylating agent are added to the solution in a concentration ratio of reducing agent:alkylating agent of 1:6.5 to 3:1.

6. The method according to claim 3, wherein the reducing agent and alkylating agent are added to the solution in a concentration range of reducing agent: alkylating agent of 1:1.

7. The method according to claim 3, wherein the reducing agent is added at a concentration of 15 to 500 mM and the alkylating agent is added at a concentration of 15 to 500 mM.

8. The method according to claim 3, wherein the reducing agent is added at a concentration of 250 mM and the alkylating agent is added at a concentration of 250 mM.

9. The method according to claim 3, wherein the alkylating agent is maleimide or an analogue thereof.

10. The method according to claim 3, wherein the calibration sample is incubated at room temperature with a reducing agent for a period of up to 20 minutes.

11. The method according to claim 10, wherein the period is about 20 minutes.

12. The method according to claim 2, wherein the reducing agent is Tris (2-carboxyethyl) phophine (TCEP).

13. The method according to claim 1, wherein the biologic molecule is a complex molecule comprising two or more subunits/species.

14. The method of claim 13, wherein the biologic molecule is selected from a recombinant protein, an antibody, and a fusion protein.

15. A method for identifying the composition of a sample containing a biologic molecule comprising:
  a) determining the molecular weight of the constituents of the sample according to the method of claim 1,
  b) identifying the constituents of the sample based on their molecular weight, and
  c) and determining the relative amounts of each of the constituents based on the CGE performed in step (a).

16. A method of determining the purity of a sample containing the biologic molecule comprising:

a) Identifying the composition of the sample according to the method of claim 15, and b) determining the relative amount of each subunit or fragment of the biologic molecule present in the sample.

* * * * *